United States Patent
Harding

(10) Patent No.: US 7,412,032 B2
(45) Date of Patent: Aug. 12, 2008

(54) X-RAY EMITTER, LIQUID-METAL ANODE FOR AN X-RAY SOURCE AND METHOD FOR OPERATING A MAGNETOHYDRODYNAMIC PUMP FOR THE SAME

(75) Inventor: Geoffrey Harding, Hamburg (DE)

(73) Assignee: GE Security Germany GmbH, Hamburg (DE)

( * ) Notice: Subject to any disclaimer, the term of this patent is extended or adjusted under 35 U.S.C. 154(b) by 0 days.

(21) Appl. No.: 10/599,042

(22) PCT Filed: Mar. 21, 2005

(86) PCT No.: PCT/EP2005/002989

§ 371 (c)(1),
(2), (4) Date: Oct. 23, 2006

(87) PCT Pub. No.: WO2005/091326

PCT Pub. Date: Sep. 29, 2005

(65) Prior Publication Data

US 2007/0274451 A1    Nov. 29, 2007

(30) Foreign Application Priority Data

Mar. 19, 2004    (DE) .................. 10 2004 013 618

(51) Int. Cl.
*H01J 35/08*    (2006.01)
(52) U.S. Cl. .................. 378/125; 378/130; 378/131
(58) Field of Classification Search ................ 378/199, 378/123–125, 136, 143, 130, 131, 200
See application file for complete search history.

(56) References Cited

U.S. PATENT DOCUMENTS 4,953,191 A    8/1990    Smither et al.

(Continued)

FOREIGN PATENT DOCUMENTS

GB    2317506 A    3/1998
WO    WO 98/16001 A    4/1998

OTHER PUBLICATIONS

Harding G et al: "Liquid metal anode X-ray tubes and their potential for high continuous power operation" Radiation Physics and Chemistry, Elsevier Science Publishers B.V.,Amsterdam,NL,Bd.67,Nr.1 (May 2003), Seiten 7-14.

(Continued)

*Primary Examiner*—Irakli Kiknadze
(74) *Attorney, Agent, or Firm*—General Electric Co.

(57) ABSTRACT

The invention relates to a method for operating a magnetohydrodynamic pump 5 for a liquid-metal anode 1 of an X-ray source.

It is provided according to the invention that it can be operated in at least two modes, wherein the first mode is a thawing mode in which the liquid metal 2 is melted in a line 3 of the liquid-metal anode 1, the second mode is an operating mode in which the liquid metal 2 is pumped through the line 3 and X-ray beams are produced. In addition, the invention relates to a liquid-metal anode 1 for an X-ray source with a liquid metal 2 which is located in a line 3, wherein an anode module 15 is inserted into the line 3 in the region of focus 4, with a pump 5 for circulating the liquid metal 2 in the line 3 and with a cooling system 6 for the liquid metal 2. According to the invention, such a liquid-metal anode 1 has a magnetohydrodynamic pump 5 as described above.

15 Claims, 1 Drawing Sheet

U.S. PATENT DOCUMENTS

| | | |
|---|---|---|
| 5,317,618 A | 5/1994 | Nakahara et al. |
| 5,415,529 A | 5/1995 | Le Boucher et al. |
| 6,185,277 B1 | 2/2001 | Harding |
| 6,560,313 B1 | 5/2003 | Harding et al. |
| 6,647,094 B2 * | 11/2003 | Harding et al. ............. 378/143 |
| 6,925,151 B2 * | 8/2005 | Harding et al. ............. 378/119 |
| 2003/0016789 A1 * | 1/2003 | Harding et al. ............. 378/143 |

OTHER PUBLICATIONS

Harding G et al:"Liquid metal anode X-ray sources and their potential applications"Nuclear Instruments & Methods in Physics Research, Section-B:Beam Interactions With Materials and Atoms, Elsevier, Amsterdam,NL,Bd.213,(Jan. 2004), Seiten 189-196.

* cited by examiner

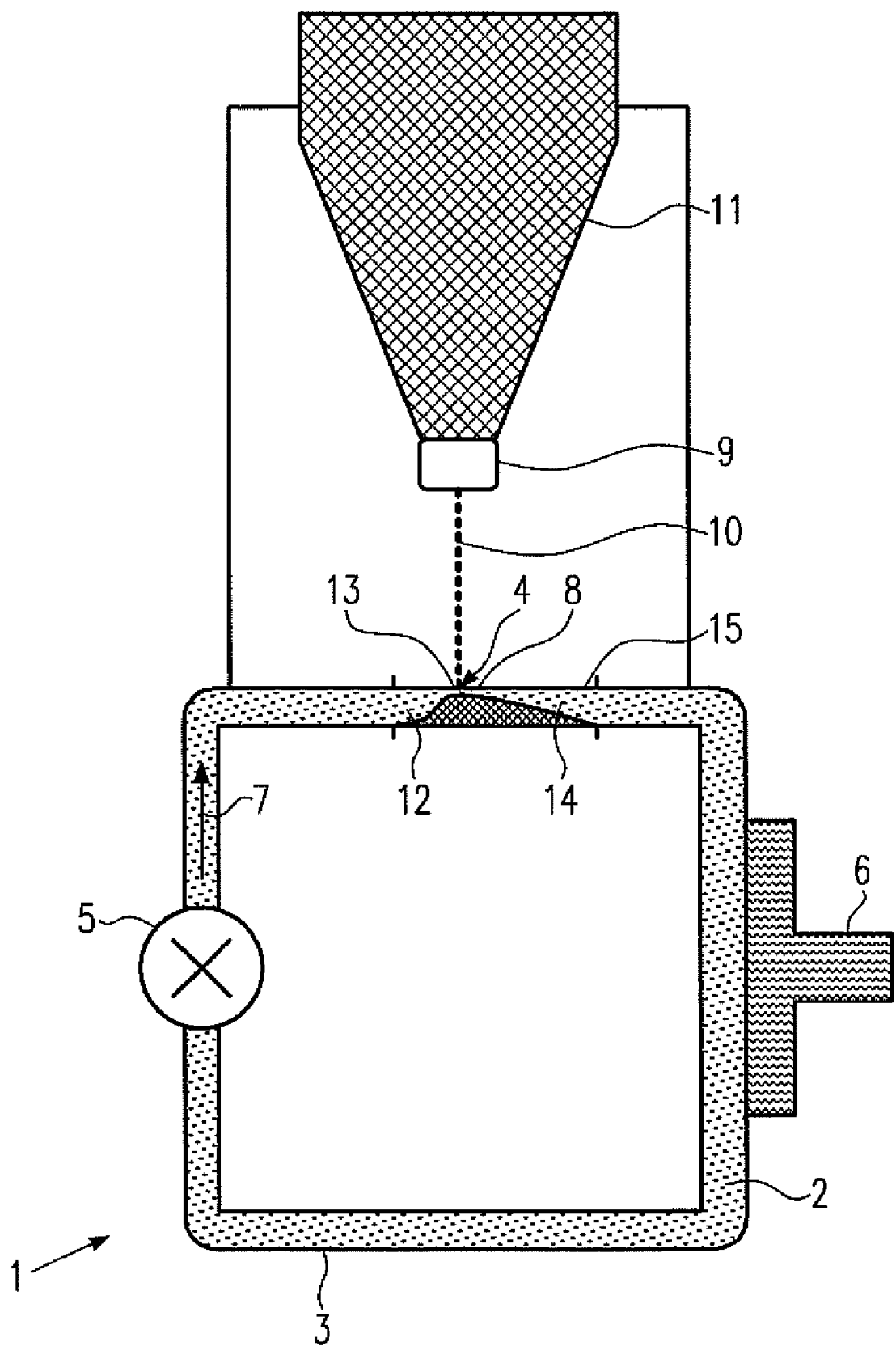

X-RAY EMITTER, LIQUID-METAL ANODE FOR AN X-RAY SOURCE AND METHOD FOR OPERATING A MAGNETOHYDRODYNAMIC PUMP FOR THE SAME

BACKGROUND OF THE INVENTION

The invention relates to a method for operating a magnetohydrodynamic pump for a liquid-metal anode of an X-ray source, with an X-ray arrangement and with a liquid-metal anode for an X-ray source with a liquid metal which is located in a line, wherein one part of the line is formed as a region of focus, and with a pump for circulating the liquid metal in the line and with a cooling system for the liquid metal.

It has been known since recently to produce X-ray beams, not via a solid-metal anode which is bombarded by electrons, but with a liquid-metal anode. This technique is called LIMAX (Liquid Metal Anode X-ray). Such a liquid-metal anode requires the following components for its operation. There is located in a line a liquid metal which must have a high average atomic number in order to achieve a good X-ray yield when bombarded with electrons. An anode module in which the electron beam strikes the liquid metal and the X-ray beam is produced is inserted into the line around the region of focus. At this point, the anode module must be formed such that it displays only a weaker interaction with the electrons passing through it. As a rule, this is achieved with a so-called electron window in which the electrons passing through are only slightly slowed down. To remove the heat produced in the region of focus, a pump is used which circulates the liquid metal through the line and thus also the region of focus. If a closed circuit of the liquid metal is used, a cooling of the heated liquid metal is achieved via a heat exchanger. Due to the predetermined framework conditions, it is necessary—as already stated above—for the liquid metal to have a high average atomic number and also an average melting point. Furthermore, the liquid-metal anode must be designed extremely compact. Thus there are marked restrictions for all of the above-named individual parts of the liquid-metal anode in respect of their interactions, because the individual parts must fit together well. This also applies in particular to the pump for circulating the liquid metal.

BRIEF DESCRIPTION OF THE INVENTION

The object of the invention is to make available individual parts of a liquid-metal anode or a complete system which enables the liquid-metal anode to function well, wherein the individual parts of the liquid-metal anode are well matched to one another.

The object is achieved by a method for operating a magnetohydrodynamic pump with the features of claim 1. In order to be able to be transported particularly well and safely when turned off, the liquid metal of a liquid-metal anode according to the invention must be solid at room temperature. In operation, on the other hand, the liquid metal must be liquid. This gives rise to the problem that a liquefaction or solidification of the liquid metal must take place between operating mode and idle mode, which can happen either via heating and cooling elements at the line of the liquid-metal anode or according to the invention by different operating modes of the magnetohydrodynamic pump. The liquid metal, which is solid in idle mode and at room temperature, is melted in the line by the thawing mode. In thawing mode, the pump engine is constantly switched on and off in turn. Eddy currents are thereby induced in the solid liquid metal which gradually disperse and lead to an ohmic heating of the liquid metal. This is continued until all of the liquid metal has melted. In contrast, in operating mode a melted liquid metal is present which is pumped through the line. X-ray beams are produced in this operating mode.

A further advantageous development of the invention provides that in the thawing mode a sensor records whether the liquid state of the liquid metal has been reached. As early as possible a switch from thawing mode into operating mode can thereby very precisely take place once all of the liquid metal has melted and is thus in the liquid state.

A further advantageous development of the invention provides that there is a third, start-up mode in which the rotation speed of the pump is increased. A slow, gradually increasing circulation of the melted liquid metal is thereby achieved and the pump need not excessively and suddenly perform to its full capacity. Particularly preferably this happens by increasing the rotation speed of the pump until the liquid metal displays its normal flow rate.

A further advantageous development of the invention provides that there is a fourth, run-down mode in which the rotation speed of the pump is reduced stepwise after X-ray beams have been produced. Pressure waves which can for example lead to a bursting of the electron window in the region of focus are thereby prevented from forming in the line. The life of the whole liquid-metal anode is thus considerably increased. The stepwise reduction of the rotation speed of the pump is preferably not carried out until the temperature of the liquid metal falls below a predeterminable threshold value which is in particular less than 50° C. above the melting point of the liquid metal.

The object is also achieved by a liquid-metal anode for an X-ray source with the features of claim 8. The pump used for this, which operates by a method according to the invention as described above, is particularly well suited to a liquid-metal anode.

A further advantageous development of the invention provides that a Bi alloy, in particular BiPb or BiPbInSn, is used as liquid metal. This has for one thing the advantage that no mercury-containing compounds, which are now prohibited in many countries for health reasons, need be used. In addition to their high average atomic number, the named Bi alloys also have a melting point which guarantees a solidification of the liquid metal in idle mode. The melting point of BiPb is 125° C. and that of BiPbInSn 55.5° C. The percentage by weight of Bi in the BiPb alloy is particularly preferably between 50 and 60 wt. %, in particular 55.5 wt. %, and the remainder is Pb. When using a BiPbInSn alloy it is particularly preferred as a rule if the BiPbInSn alloy contains 49.4 wt. % Bi, 18.8 wt. % Pb, 21.0 Pb In and 11.6 wt. % Sn.

A further advantageous development of the invention provides that the line is made of molybdenum. As bismuth alloys corrode steel pipes when the temperature of the bismuth alloy is in the range of a few hundred degrees—which is normal during operation under a bombardment by electrons in the region of focus—this is avoided when using a molybdenum line.

A further advantageous development of the invention provides that the anode module is made completely of molybdenum and an electron window is inserted therein which consists of light-permeable cubic boron nitride—T-cBN. This ensures that there is also no corrosion of the line by the liquid bismuth alloy in the region of focus. The electron window, which is usually soldered to the region of focus, has very similar coefficients of thermal expansion to molybdenum which are in each case in the region of $4 \times 10^{-6}$ $K^{-1}$. Tensile stresses upon heating, which could cause the electron window to burst, are thereby avoided. In addition, T-cBN has a high heat conductivity of 300 W m$^{-1}$K$^{-1}$. The thickness of the electron window is particularly preferably 40 μm.

A further advantageous development of the invention provides that the cooling system is a minichannel cross-flow heat exchanger. Thus a good cooling of the hot liquid metal is possible even if there is little space for the whole liquid-metal anode.

BRIEF DESCRIPTION OF THE DRAWING

Further details and advantages of the invention are described with the help of the embodiment shown in more detail in the figure of a liquid-metal anode according to the invention. The single FIGURE shows:

A schematic representation of a liquid-metal anode according to the invention including electron source.

DETAILED DESCRIPTION OF THE INVENTION

There is shown schematically in the figure a liquid-metal anode 1 according to the invention as arranged in relation to a cathode 9. The cathode 9 is attached to a high-voltage insulator 11 and serves to produce an electron beam 10 which strikes the liquid-metal anode 1 and is used there to produce X-ray beams.

With many applications in the field of nondestructive analysis and security monitoring of items of luggage, it is necessary for the X-ray source to produce an X-radiation over a considerable period of time, sometimes over several hours. For this reason it is necessary in the case of liquid-metal anodes 1 that the liquid metal 2 circulate continuously through the line 3 of the liquid-metal anode 1. For this, it has a pump 5 which circulates the liquid metal 2 in the line 3. In addition, a cooling system 6 is also necessary in order to cool the liquid metal 2 which is strongly heated in the region of focus 4—where the electron beam 10 strikes the liquid-metal anode 1. It is furthermore necessary that the X-ray source and thus also the liquid-metal anode 1 can be transported problem-free and safely from one location to another location without parts essential to operation being broken. This may be, in particular, an electron window 8 through which the electron beam 10 in the anode module 15 penetrates to the liquid metal 2. When using a potential in the region of 200 kV, an antipolar high-voltage generator is normally used in which the housing is kept at earth potential, but the liquid-metal anode 1 and the cathode 9 are kept symmetrically at opposite potentials in relation to the earth potential. As a result, it is necessary that the liquid-metal anode 1, in particular its line 3, be designed very compact so that it can be easily fitted into the terminal of the antipolar high-voltage generator that is kept at the negative high-voltage potential.

For this it is necessary to equip the liquid-metal anode 1 with components that are described in more detail below.

To obtain a high yield of X-ray beams, a liquid metal 2 with a high atomic number must be used. The formerly preferred mercury can no longer be used, as its side effects pose a threat to health and the environment. An alloy which contains bismuth or lead is therefore used in the liquid-metal anode 1 according to the invention. An alloy which contains both bismuth and lead is preferred. A liquid metal of BiPb containing 55.5 wt. % Bi and the remainder Pb is particularly preferably used. This alloy has a melting point of 125° C. Another particularly preferred alloy is BiPbInSn containing 49.4 wt. % Bi, 18.0 wt. % Pb, 21.0 wt. % In and the remainder Sn. This alloy has a melting point of 55.5° C. Thus the liquid metal 2 used is solid at room temperature and a liquid-metal anode 1 with such a liquid metal 2 can be safely transported without the risk that the electron window 8 will burst if the normal precautions are taken. In addition, the two above-named alloys have the advantage that they decrease in volume as they solidify. The line 3, in particular the thin electron window 8, is thereby prevented from bursting, as would be the case for example with water which expands as it freezes. In addition, the two embodiments of the alloys each contain lead and bismuth, both of which have a high vapour pressure. A crack in the electron window 8 in operating mode—when the liquid metal 2 is pumped in liquid form through the line 3—can then be very easily ascertained by monitoring the quality of the vacuum in the X-ray tube.

If an indium alloy is used as liquid metal 2, steel cannot be used for the line 3, as indium corrodes steel lines at a temperature of 100° C.—as is always the case in operating mode. To prevent such corrosion, the line 3 and the whole anode module 15 are made of molybdenum. This also has the advantage that it is excellently matched in respect of its coefficient of thermal expansion to the electron window 8 described further below. In addition, a line 3 made of molybdenum has a low magnetic permeability, which is important for the satisfactory functioning of the pump 5—as described below.

The anode module 15 is formed as follows in its region of focus 4. It has an electron window 8 facing the cathode 9. The electron beam 10 passes through this electron window 8 in order to interact with the liquid metal 2 and thus produce X-ray beams. To date, either thin tungsten or molybdenum metal foils and diamond films are known as electron window 8. However, the known metal films are susceptible to fatigue cracks. The diamond films have the disadvantage that their coefficient of thermal expansion—which lies at approximately 1×10$^{-6}$ K$^{-1}$—means they are very different compared with the material of the anode module 15—namely molybdenum with a coefficient of thermal expansion of 4×10$^{-6}$ K$^{-1}$. This difference leads to stresses in the electron window 8 as it is normally soldered to the anode module 15 at a temperature of 1,100° C. This results in an extremely disadvantageous shortening of the life and a high sensitivity to pressure of the region of focus 4. For this reason, in the embodiment an electron window 8 is used which consists of a T-cBN, which is used in a similar manner to a cooling element for a high-power laser anode. Compared with the electron window 8 named above, T-cBN has the advantage of a high heat conductivity in the region of 300 W m$^{-1}$K$^{-1}$ in conjunction with a coefficient of thermal expansion of 4×10$^{-6}$ K$^{-1}$. This coefficient of thermal expansion matches that of molybdenum of which the anode module 15—also in the area of the region of focus 4—is made. To achieve if at all possible only a low energy loss and hardly any interaction of the electron beam 10 in the electron window 8, the electron window 8 is only 40 μm thick.

In the region of focus 4, the anode module 15 has successively in the direction of flow 7 a confusor area 12, an interaction area 13 and a diffusor area 14. A turbulent (swirled) flow of the liquid metal 2 is produced in the confusor area 12. The effect of the swirls is that in the interaction area 13 there is a good thermal transport of the heat produced during the interaction with the electron beam 10 in the liquid metal 2. In the adjacent diffusor area 14, the rate of the flow is returned to the normal value without major friction losses.

Because a liquid metal 2 is used which is solid at room temperature and liquid in operating mode, it must always be heated above its melting point before operation to ensure a satisfactory functioning of the X-ray source. The pump 5 according to the invention plays an important role here. In addition to the standard role of a pump 5—namely the circulation of the liquid metal 2 in the line 3—it also detects the melting and heating of the liquid metal 2. Finally, due to the required compact design of the whole liquid-metal anode 1—because it must be set to the cathode potential of the X-ray source—the pump 5 must also be designed very compact. The above-named key elements are fulfilled by a contactless basic principle which uses a magnetohydrodynamic force. With such a pump 5, an alternating magnetic field can be produced using a system of permanent magnets which are arranged on a plate driven by a conventional small A.C. motor. The advantages of such a magnetohydrodynamic pump 5 which uses permanent magnets are higher efficiency, no electric insulation problems at high temperatures, a simpler design and a lower weight plus smaller dimensions. As already stated above, the line 3 is made of molybdenum, which has a low magnetic permeability. As a result it is possible for the alternating magnetic fields—which are produced by the rotation of the permanent magnets—to pass through the line 3 and thereby induce a force in the liquid metal 2. This is important for the thawing mode described below.

The pump 5 is screened from the vacuum system of the X-ray tubes, so that there is no interaction in the electromagnetic system. The pump 5 according to the invention has four different modes, namely a thawing mode, a start-up mode, an operating mode and a run-down mode, which are described in detail below.

As described above, because its melting point lies above room temperature, the liquid metal 2 must be heated and melted before starting up the X-ray source. In order to obtain as compact a system as possible, this is jointly fulfilled by the pump 5 in the embodiment. In this thawing mode, the heating effect is produced by operating the pump engine in pulses. If an alternating magnetic field is induced in a solid metal, eddy currents form due to the magnetohydrodynamic forces. As the liquid metal 2 cannot move in its solid state, the eddy currents gradually disperse and lead to an ohmic heating of the liquid metal 2 present in solid form. The effect of the pulsed operation of the pump 5 is that the already melted liquid metal 2 gradually emits heat to the still solid liquid metal 2. The thawing mode is ended when a temperature sensor near the region of focus 4 on the end remote from the pump in the direction of flow 7 reports that the liquid state of the liquid metal 2 has been reached.

In start-up mode, electric power is continuously fed to the pump 5 and transmitted to the liquid metal 2. The electric power transmitted to the pump 5 at the nominal rotation speed is measured. If there is no further change in the electric power consumption, the liquid metal 2 has reached its normal flow rate.

When this start-up mode has ended, operating mode can be started. In this mode, the electron beam 10 is bombarded onto the liquid metal 2 in the region of focus 4 to produce the X-radiation. For this, high voltage is applied to the X-ray source. In operating mode, force is also transmitted to the liquid metal 2 via the pump 5, in order to compensate for friction losses in the circuit.

Once the high voltage of the X-ray tubes has been switched off and no further electron beam 10 strikes the liquid metal 2, the liquid metal 2 is nevertheless still very hot. The pump 5 therefore still operates at normal capacity until the temperature of the region of focus 4 has fallen below a predetermined threshold value. A temperature which is 50° C. above the melting point of the liquid metal 2 used is preferably taken as threshold value. A threshold value of 175° C. thus results when using BiPb and a threshold value of 105.5° C. when using BiPbInSn. If this threshold value is not reached, the electric capacity of the pump is reduced stepwise in order to avoid pressure waves of the liquid metal 2 inside the line 3.

This results in a considerable extension of the life of the liquid-metal anode 1, because in particular the very thin pressure-susceptible electron window 8 is not damaged.

The cooling system 6 is the final element of the liquid-metal anode 1 to be described. This is a compact minichannel cross-flow heat exchanger made of molybdenum. The hydraulic diameter of the channels is between 0.3 and 3 mm. The hot liquid metal 2 is cooled in the only very small volume available of a few cm³. In the secondary cooling circuit, an oil is used which is high-voltage resistant and heat-resistant at moderate temperatures so that no electric break-downs occur. Such heat exchangers are known in the literature and are therefore not described in more detail below.

The X-radiator according to the invention thus has a cathode 9 for the emission of an electron beam 10 which, when it strikes the liquid-metal anode 1, leads to the emission of X-ray beams.

LIST OF REFERENCE NUMBERS

1 Liquid-metal anode
2 Liquid metal
3 Line
4 Region of focus
5 Pump
6 Cooling system
7 Direction of flow
8 Electron window
9 Cathode
10 Electron beam
11 High-voltage insulator
12 Confusor area
13 Interaction area
14 Diffusor area
15 Anode module

What is claimed is:

1. Method for operating a magnetohydrodynamic pump for a liquid-metal anode of an X-ray source, wherein the magnetohydrodynamic pump is configured to be operated in at least two modes, the method comprising:
   in a first thawing mode, melting liquid metal in a line of the liquid-metal anode; and
   in a second operating mode, pumping the liquid metal through the line and producing X-ray beams,
   wherein in the first thawing mode, the engine of the pump is constantly switched on and off in turn.

2. Method according to claim 1, wherein, in the thawing mode, a sensor records whether the liquid state of the liquid metal has been reached.

3. Method according to claim 1, further comprising a third, start-up mode between the first thawing mode and the second operating mode, in which the rotation speed of the pump is increased.

4. Method according to claim 3, wherein the rotation speed of the pump is increased until the liquid metal displays its normal flow rate.

5. Method according to claim 1, further comprising, after the operating mode, a fourth, run-down mode in which the rotation speed of the pump is reduced stepwise after X-ray beams have been produced.

6. Method according to claim 5, wherein the stepwise reduction of the rotation speed of the pump occurs when a temperature of a region of focus falls below a predetermined threshold value.

7. Method according to claim 6, wherein the predetermined threshold value is 50° above the melting point of the liquid metal.

8. A liquid-metal anode for an X-ray source with a liquid metal which is located in a line, the liquid-metal anode comprising:
   an anode module inserted into the line in a region of focus, with a pump for circulating the liquid metal in the line and with a cooling system for the liquid metal; and
   an electron window inserted into the anode module,
   wherein the pump is configured to be operated as a magnetohydrodynamic pump by a method according to the method of claim 1.

9. Liquid-metal anode according to claim 8, wherein a Bi alloy, in particular BiPb or BiPbInSn, is used as liquid metal.

10. Liquid-metal anode according to claim 9, wherein the percentage by weight of Bi in the BiPb alloy is between 50 and 60 wt. %, in particular 55.5 wt. %, and the remainder is Pb.

11. Liquid-metal anode according to claim 9, wherein the BiPb alloy contains 49.4 wt. % Bi, 18.8 wt. % Pb, 21.0 wt. % In and 11.6 wt. % Sn.

12. Liquid-metal anode according to claim 8, wherein the line is made of molybdenum.

13. Liquid-metal anode according to claim 8, wherein the anode module is made completely of molybdenum into which an electron window is inserted which consists of light-permeable cubic boron nitride.

14. Liquid-metal anode according to claim 8, wherein the electron window is 10-80 μm, in particular 40 μm, thick.

15. Liquid-metal anode according to claim 8, wherein the cooling system is a minichannel cross-flow heat exchanger.

* * * * *